(12) United States Patent
Shafir Nir et al.

(10) Patent No.: US 10,811,052 B2
(45) Date of Patent: Oct. 20, 2020

(54) SYSTEM AND METHODS FOR GENERATING MEDIA ASSETS

(71) Applicant: Fusic LTD., Tel Aviv (IL)

(72) Inventors: Michal Shafir Nir, Tel Aviv (IL); Florian Gmeiner, Berlin (DE); Liat Sade Sternberg, Pacific Palisades, CA (US)

(73) Assignee: FUSIT, INC., Santa Monica, CA (US)

( * ) Notice: Subject to any disclaimer, the term of this patent is extended or adjusted under 35 U.S.C. 154(b) by 0 days.

(21) Appl. No.: 16/139,658

(22) Filed: Sep. 24, 2018

(65) Prior Publication Data

US 2019/0096438 A1    Mar. 28, 2019

Related U.S. Application Data

(60) Provisional application No. 62/562,437, filed on Sep. 24, 2017.

(51) Int. Cl.
*G06F 3/0484* (2013.01)
*G11B 27/036* (2006.01)
(Continued)

(52) U.S. Cl.
CPC ...... *G11B 27/036* (2013.01); *G11B 20/10527* (2013.01); *G11B 27/34* (2013.01);
(Continued)

(58) Field of Classification Search
CPC ....... H04N 21/44008; H04N 21/47205; H04N 21/23424; H04N 21/234345; H04N 21/2743
See application file for complete search history.

(56) References Cited

U.S. PATENT DOCUMENTS 7,015,954 B1  3/2006 Foote
8,438,602 B2  5/2013 Rao
(Continued)

FOREIGN PATENT DOCUMENTS

EP  1376582  1/2004

OTHER PUBLICATIONS

"Image and Video Abstraction by Anisotropic Kuwahara Filtering", Pacific Graphics 2009, Jan Erics Kyprianidis et al.*
(Continued)

*Primary Examiner* — Namitha Pillai
(74) *Attorney, Agent, or Firm* — Browdy and Neimark, PLLC

(57) ABSTRACT

There are provided methods and systems for media processing, comprising: providing a plurality of media asset sources, via a network to a user device; processing said plurality of media asset sources, wherein said processing comprises selecting at least one image asset at each of said media asset sources and detecting features at the selected image asset sources along the media asset sources frames; receiving via the network from the user device a media recording; processing said user media recording, wherein said processing comprises selecting at least one element in the media recording and applying the detected features on the at least one element; mixing the processed media assets with the processed media recording according to input data to yield one or multiple variations of mixed media assets.

19 Claims, 14 Drawing Sheets

(51) Int. Cl.

| | | |
|---|---|---|
| *G11B 20/10* | (2006.01) | |
| *G11B 27/34* | (2006.01) | |
| *H04N 21/218* | (2011.01) | |
| *H04N 21/266* | (2011.01) | |
| *H04N 21/472* | (2011.01) | |
| *H04N 21/44* | (2011.01) | |
| *H04N 21/85* | (2011.01) | |

(52) U.S. Cl.
CPC ......... *H04N 21/218* (2013.01); *H04N 21/266* (2013.01); *H04N 21/44008* (2013.01); *H04N 21/47205* (2013.01); *H04N 21/85* (2013.01); *G11B 2020/10537* (2013.01); *G11B 2220/60* (2013.01)

(56) References Cited

U.S. PATENT DOCUMENTS

| | | |
|---|---|---|
| 8,782,176 B2 | 7/2014 | Zohar et al. |
| 8,860,865 B2 | 10/2014 | Dukellis |
| 8,934,759 B2 | 1/2015 | Kikuchi |
| 9,462,301 B2 | 10/2016 | Stanislaw |
| 2012/0197970 A1* | 8/2012 | Arturi .................. G06F 16/958 709/203 |
| 2013/0125000 A1 | 5/2013 | Fleischhauer |
| 2015/0077631 A1* | 3/2015 | Yin ........................ H04N 5/40 348/441 |
| 2015/0143405 A1* | 5/2015 | Hogan ............... H04N 21/8146 725/32 |
| 2015/0147046 A1 | 5/2015 | Van Broeck |
| 2017/0180780 A1 | 6/2017 | Jeffries |
| 2017/0294212 A1* | 10/2017 | Allen .................. G11B 27/031 |

OTHER PUBLICATIONS

"Image-Based Modeliing Technqiues for Artistic Rendering", Clemson University, Bynum Murray, May 2010.*

* cited by examiner

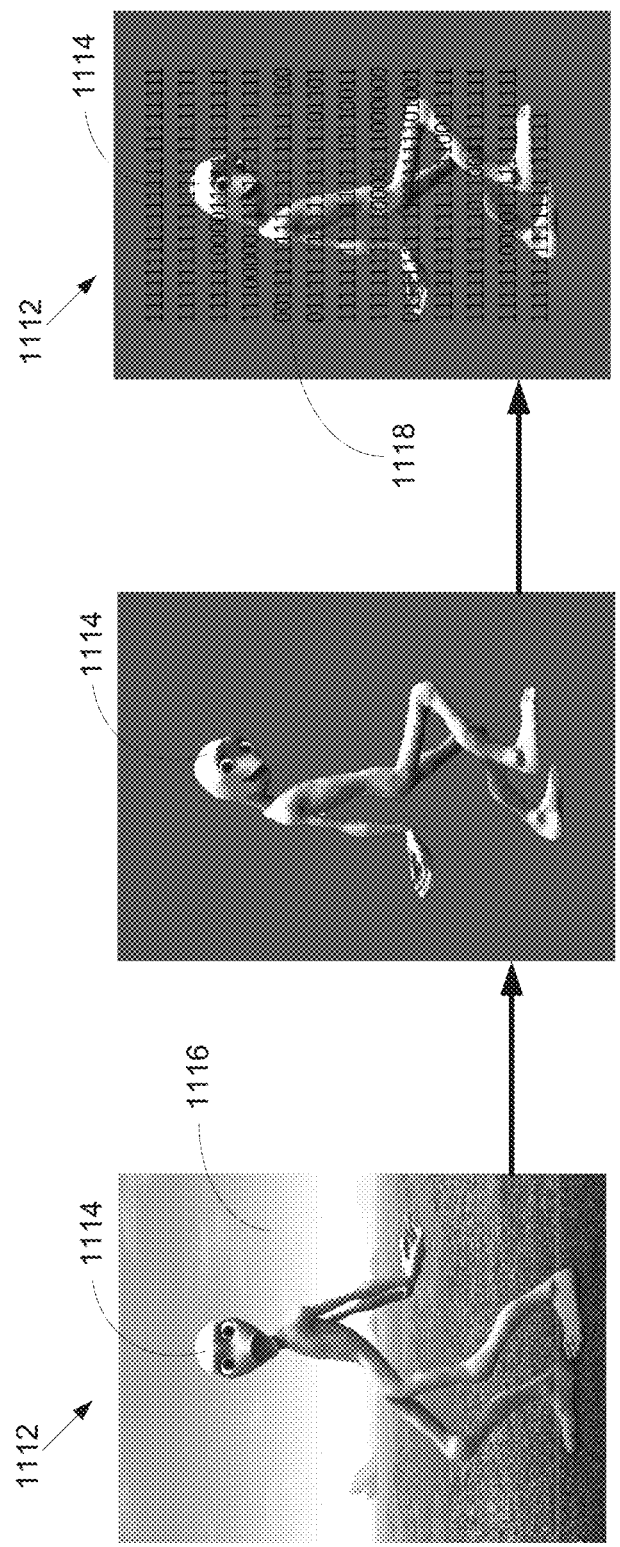

US 10,811,052 B2

SYSTEM AND METHODS FOR GENERATING MEDIA ASSETS

CROSS-REFERENCE

The present application claims the benefit of U.S. Provisional Application Ser. No. 62/562,437 filed on Sep. 24, 2017, entitled "SYSTEM AND METHODS FOR GENERATING MEDIA ASSETS", the entire disclosures of which are incorporated herein by reference.

FIELD OF THE INVENTION

The present invention relates generally to media processing, and particularly to automatically editing and mixing of video and audio streams from different sources.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE INVENTION

Social mobile video platforms and live-streaming options on online video platforms including for example YouTube, Instagram, Snapchat and social media sites such as Facebook are still growing in popularity. Accordingly, various applications and systems for digital graphic design, image editing, audio editing, video mixing and video editing known in the art provide social platforms users with tools to create a variety of media contents.

The above-mentioned video mixing and editing applications can be less than ideal in at least some respects. Prior video editing applications are time-consuming and require professional editing skills as typically the image mixing and blending, filter adding and image manipulation are all manually performed. For example, in cases where a number of video and audio media contents from different sources are combined to a single movie file, the editing process requires manually editing numerous media clips into a timeline. A layman editor (e.g. social media user) will then find it difficult and time-intensive to figure out how clips should be combined, aligned or trimmed. Furthermore, any further change in the combined video clip will require additional audio and video synchronization steps in the editing process. The layman editor will then be hesitant to make additional changes to the clip as this will require making multiple corrections in multiple places. As a result, the uploaded media clip will be unprofessional with a low chance to increase the number of media clip views.

SUMMARY OF THE INVENTION

According to a first aspect of some embodiments there is provided a method for media processing, comprising: providing one or more media asset sources, via a network to a user device; processing said one or more media asset sources, wherein said processing comprises selecting at least one image asset at each of said one or more media asset sources and detecting features at the selected image asset sources along the media asset sources frames; receiving via the network from the user device a media recording; processing said media recording, wherein said processing comprises selecting at least one element in the media recording and applying the detected features on the at least one element or the media asset sources frames; mixing the processed media assets with the processed media recording according to input data to yield one or more mixed media assets.

In an embodiment, the mixing comprises replacing the image asset of said one or more media asset sources with said selected at least one element.

In an embodiment, the mixing comprises: replacing pixels of each frame of said media recording with pixels of said image asset according to a predefined alpha map.

In an embodiment, the method comprising processing and synchronizing the one or more mixed media assets the processing and synchronizing comprises smoothing the blended edges and color filtering each frame of the one or more mixed media assets.

In an embodiment, the features are applied on said one or more media sources according to processing modules, said processing modules are selected from the group consisting of blending module, transformation module and image sizing module.

In an embodiment, the transformation module is configured to track an image rotating or cropping between frames of the media asset sources and define the coordinates vectors for each frame.

In an embodiment, each of said plurality of media asset sources and media recording comprises at least source video data and at least source audio data.

In an embodiment, the mixing further comprises: audio processing simultaneously and differently each audio of the plurality of media asset sources according to the input data.

In an embodiment, the mixing comprises: image processing simultaneously and differently each video of the plurality of media asset sources according to the input data.

In an embodiment, the processing and synchronizing comprises additional audio and video filtering, said additional audio and video filtering comprises one or more of low pass filtering for eliminating noise resulted from the audio and video mixing.

In an embodiment, the input data comprises one or more setting preferences for mixing and synchronizing the one or more media sources and the media recording.

In an embodiment, wherein said selecting at least one image asset at each of said media asset sources comprises providing video replacement markers on each of said one or more media asset sources.

In an embodiment, the at least one element or said image asset is an image of a face or a body.

In an embodiment, the media recording is recorded by the user of the client device while playing at least one of the one or more media asset sources.

In an embodiment, the media recording is recorded by a user of the client device while playing the source audio data.

In an embodiment, the method comprising transmitting the mixed media assets to client devices over the network for playback by users of the client device.

According to a second aspect of some embodiments there is provided a system for media processing, comprising: a memory, which is configured to hold one or more media asset sources; and a processor, said processor is configured to: select at least one image asset at each of said one or more media asset sources and detect features in the selected image asset along the media asset sources frames; receive via the network from the user device a media recording; process said media recording, wherein said processing comprises selecting at least one element in the media recording and applying the detected features on the at least one element or media recording; mix the media assets with the processed media recording according to a input data to yield one or more mixed media assets.

In an embodiment, the mixing comprises replacing the image asset of said media assets with said selected at least one element.

In an embodiment, the mixing comprises: replacing pixels of each frame of said media recording with pixels of said image asset, according to a predefined alpha map.

In an embodiment, the plurality of media asset sources comprise at least audio data and media data and wherein the processor is configured to simultaneously and differently process each audio data and video data of the plurality of media asset sources according to the input data.

According to a third aspect of some embodiments there is provided a method for media processing, comprising: displaying a list of media asset sources at a client device; receiving one or more selected media asset sources from the list of media asset sources at the client device; receiving one or more media recordings comprising client video and client audio data recorded by a user of the client device; detecting one or more areas at the media recording; generating a mesh on the detected area; projecting frame by frame of the media recording the selected media asset on the formed mesh; generating an alpha map on the formed mesh; replacing selected pixels and keeping pixels, frame by frame according to the generated alpha map to yield a mixed media asset.

In an embodiment, the method comprising displaying the mixed media asset.

In an embodiment, the mixed media asset is generated in real time while displaying the mixed media asset.

In an embodiment, the selected one or more media asset sources are processed in an offline mode.

In an embodiment, the one or more media asset sources comprise background portion and object portions and wherein the deleted pixels are background pixels while the object portion pixels are kept frame by frame.

In an embodiment, the object image is selected from the consisting of: a character, an animated character, an AR (augmented reality) character, a VR (virtual reality) character, a face, a full body.

In an embodiment, the detected one or more areas are flat surfaces in the selected media asset.

In an embodiment, the flat surfaces are a floor or chair or table.

In an embodiment, the mesh is a clear colored mesh.

In an embodiment, the mesh is generated orthogonally to the detected one or more areas.

In an embodiment, the mesh is rectangle shaped.

In an embodiment, the method comprising: detecting features at the selected image asset sources along the media asset sources frames; applying the detected features on the one or more media recordings.

According to a forth aspect of some embodiments there is provided a method for media processing, comprising: providing one or more media asset sources to a user device; processing said one or more media asset sources, wherein said processing comprises selecting at least one image asset at each of said one or more media asset sources frames and detecting features at the selected image asset sources along the media asset sources frames; receiving or generating a media recording comprising client video and client audio data recorded by a user of the client device; processing said media recording, wherein said processing comprises selecting at least one element in the media recording and applying the detected features on the at least one element; replacing the selected image asset of said one or more media asset sources with said selected at least one element to yield a mixed media asset; and displaying said selected media element.

BRIEF DESCRIPTION OF THE DRAWINGS

A better understanding of the features and advantages of the present disclosure will be obtained by reference to the following detailed description that sets forth illustrative embodiments, in which the principles of embodiments of the present disclosure are utilized, and the accompanying drawings.

FIG. 11A-11C show respective examples of frames as processed according to the processing method, in accordance with embodiments.

Figure 1:
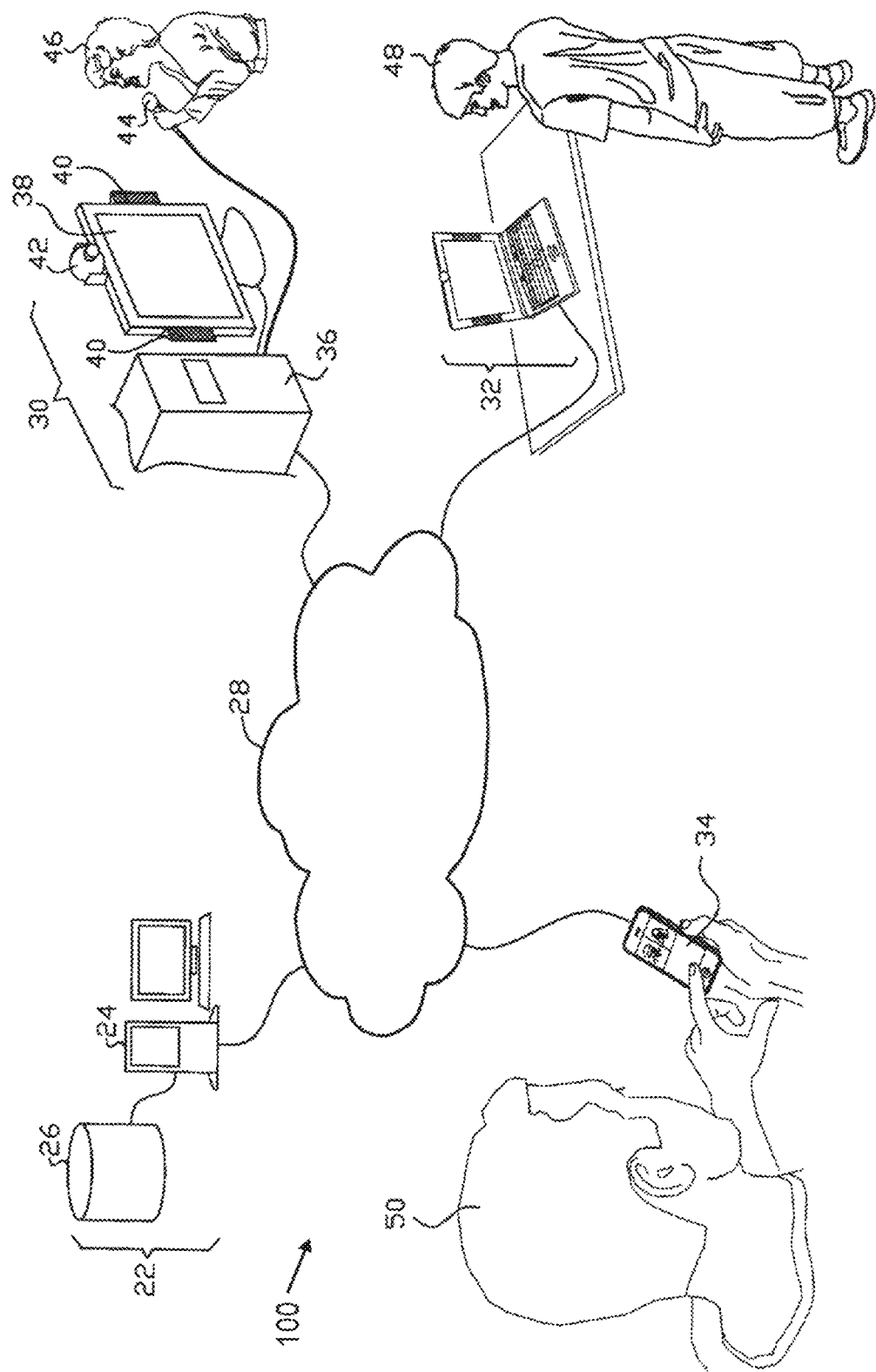
FIG. 1 is a schematic diagram of automatic real-time media asset creator and distribution system, in accordance with embodiments.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore, the invention is not limited by that which is illustrated in the figure and described in the specification, but only as indicated in the accompanying claims, with the proper scope determined only by the broadest interpretation of said claims.

DETAILED DESCRIPTION OF THE INVENTION

Prior to setting forth the detailed description of the invention, it may be helpful to set forth definitions of certain terms that will be used hereinafter.

The term 'media recording' as used herein and through the specification and claims should be understood to encompass a video such as a client video which may also include client audio data recorded for example by a user by the client device.

The term 'media asset source' as used herein and through the specification and claims should be understood to encompass a video and/or audio which the user wishes to mix with a media recording. A media asset source may be or may include a media clip which is a short version of a media asset.

The term 'image asset' as used herein and through the specification and claims should be understood to encompass a video portion of the media asset source which is replaced by, or inserted to, or mixed with the media recording.

The term 'user image' as used herein is defined as a video portion of the media recording which replaces the image asset while mixed with the media asset source.

The term 'mixed media asset' as used herein and through the specification and claims should be understood to encompass a media asset source mixed with a media recording.

While viewing media assets such as movies or games social media users may wish to record their own video and combine their recording with other media assets in order to create the impression that they are part of the movie or the game. Talent shows and recording studios enable fans and clients to implement those combined recordings but at a high cost in terms of time, money and effort. For example, media recording software on personal computers and home entertainment consoles allows users to take their own pictures and generate digital effects, motion graphics and compositions using media assets. The modified pictures can then be uploaded to websites. Mixing together audio and video from different sources, however, remains beyond the capabilities of most users and the equipment at their disposal.

Embodiments that are described hereinbelow address this unmet need by enabling users to mix and synchronize media asset sources such as movies or games with media recordings such as user media recordings in a simple and automatic manner User media recordings may include the user's image or any image around the user such as the user's room or other properties. Alternatively, the media recording may comprise any suitable sort of media content, such as instrumental music or stage performances in which the user takes part.

In the disclosed embodiments, the systems, devices or methods are configured to receive, for example via the network or via other sources, one or more media recordings wherein the media recording may comprise a source audio data and video. In some cases, the user may record a video, such as a selfie, on his device or other devices and upload his recording to the server or directly to his device. Following the upload or during the upload or while the recording is being performed (e.g. on real time) the user may select one or more media asset sources presented for example on the user interface menu which he wishes to mix with his recording or with direct camera input (on real time). At the next step, the server or the user device automatically mixes and synchronizes the selected media assets with the media recording to generate one or more mixed media assets and display the mixed media assets for example at the user's device display. Finally, the user may share the one or more mixed media assets via the network to other client devices by for example one or more social mobile video platforms.

According to another embodiment, there are provided systems devices and methods for generating a plurality of mixed media assets which include a media recording combined differently with each media asset source of the media asset source. For example, the systems and methods may automatically and simultaneously create multiple variations of mixed media assets for example in real-time, wherein each mixed media asset relates to a different media category, e.g. comedy, musical, drama etc. At each of the combined media asset the media recording is mixed and synchronized automatically for example according to the selected category or according to one or more predefined control functions (e.g. input data), e.g. for a comedy category funny soundtrack and features will be included in the mixed media asset while for horror category frightening soundtrack effects will be combined in the mixed media asset.

In some cases, the one or more predefined control function data may include one or more setting preferences for mixing and synchronizing the media sources and the user media recordings. The setting preferences may be uploaded by the user or automatically by the system, for example in advance, e.g., prior to the media assets downloading or in real time while playing the media assets.

According to one embodiment, the mixing and synchronization process may comprise providing video replacement markers on the media asset source. The replacement markers define the coordinators where an image which is part of media asset will be replaced for example with the user media recording.

FIG. 1 is a schematic diagram of a media asset creation and a distribution system 100, in accordance with embodiments. A media server 22 comprises a processor 24 and a memory 26, which may store one or more of media assets. Memory 26 also stores a plurality of media recordings such as personal recording of different users that processor 24 has received from user clients. Typically, server 22 comprises a suitable general-purpose computer (or a cluster of such computers), which has been programmed in software to carry out the functions that are described herein. This software may be downloaded to the computer in electronic form, over a network, for example. Additionally or alternatively, the software may be stored on tangible, non-transitory computer-readable media, such as magnetic, optical, or electronic memory media.

Server 22 communicates over a network 28 with multiple client devices 30, 32, 34. Typically, network 28 comprises the public Internet, and server 22 communicates with the client devices via a suitable Web interface, as is known in the art. Alternatively, the server and clients may communicate using any other suitable sort of network and interfaces.

Client devices 30, 32, 34 may comprise, for example, desktop, laptop, or tablet computers, media consoles, personal digital assistants or smartphones, or any other sort of device with the types of network, video and audio interfaces and computing capabilities needed to interact with server 22. By way of example, client device 30 comprises a computer with a processor 36, memory, video display 38 and speakers 40 for playing media assets, along with a video camera 42 and microphone 44 for recording. Client devices 32 and 34 are similarly equipped, though in different configurations.

In operation, users 46, 48 and 50 may record their recordings for example on their devices 30, 32 and 34 and upload the respective users' recordings via the network to server 22. Processor 24 is configured to store the users' recordings in memory 26. Users 46, 48 and 50 may select one of the stored media assets on memory 26 and request server 22 to play the selected asset mixed with any of the users' recordings. As will be further illustrated in details below in respect to FIGS. 2A-11C, processor 24 is configured to select or receive a selection of one or more image assets within the selected media asset, pre-process the selected media recording and the media assets so both will be compatible, replace the selected image assets with the user's recording (e.g. image) and create one or more mixed media assets which include a mix of the user image and media asset. Once the composition process is finalized, users 46, 48 and 50 may download the mixed media asset from server 22 and play it on their respective client devices 30, 32 and 34 or send it via the network to a friend.

In some embodiment, the processor is configured to receive the image asset section. For example, users 46, 48 and 50 may select a specific image asset and upload the selected image asset to the server. The selection may be initiated using any input device such as a mouse or touchscreen. Client devices 30, 32 and 34 are configured to translate the users selection to replacement markers and upload the replacement markers to server 22 for the image asset replacement process as will be illustrated herein in respect to FIGS. 2A-5.

Figure 2A:
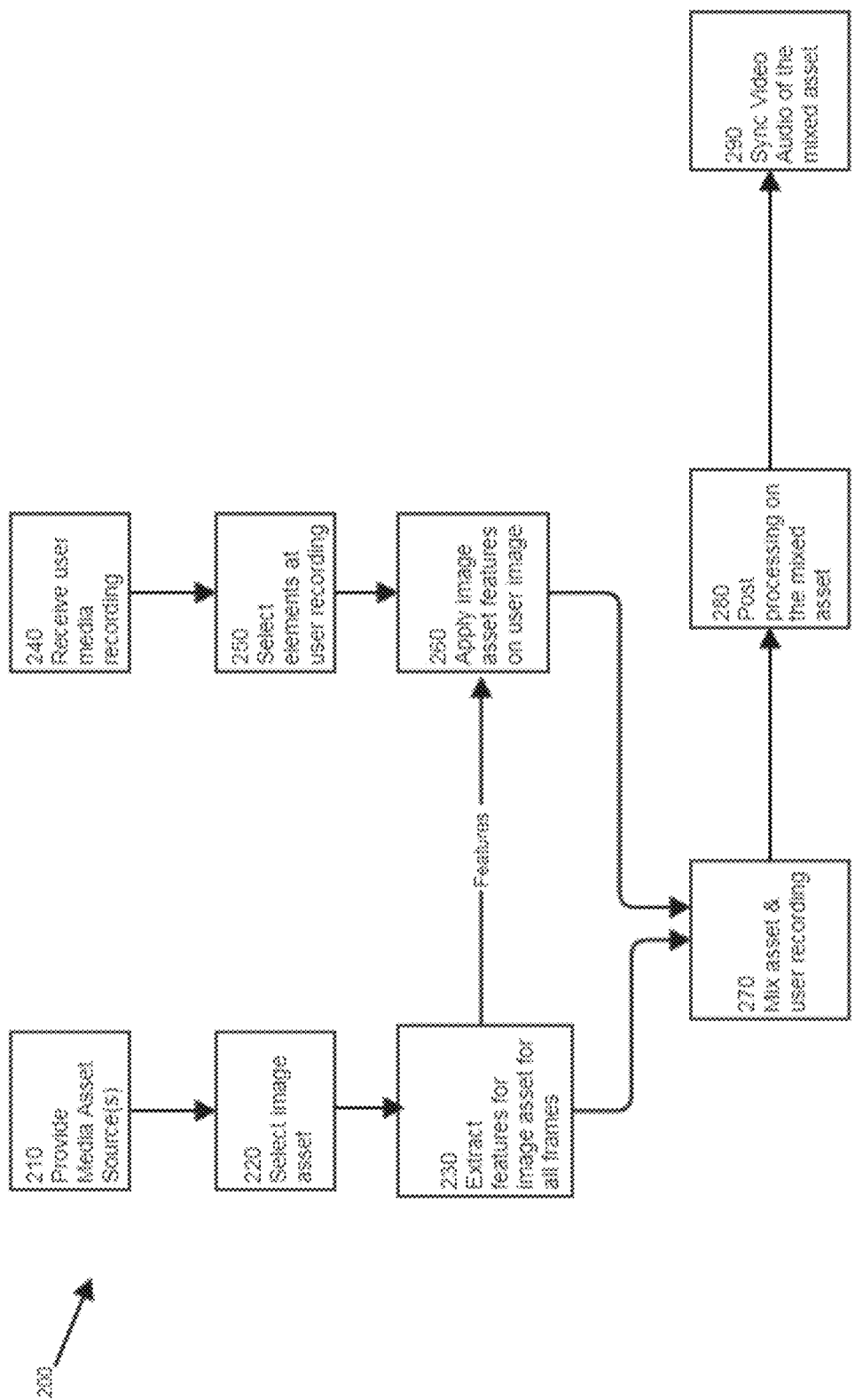
FIG. 2A shows a flowchart of a method for automatically mixing and synchronizing media assets from different sources to provide a plurality of different mixed media assets, in accordance with embodiments.

FIG. 2A shows a flowchart of a method 200 for automatically mixing and synchronizing media assets from different sources, such as mixing and synchronizing one or more media asset sources with a media recording to provide one or more different mixed media assets (e.g. multiple mixed media assets variations), in accordance with embodiments. At step 210 one or more media asset sources, comprising for example source video data and source audio data, are provided. In some cases, the one or more media asset sources may be downloaded via the network to the user device. In some cases, the media asset sources may be generated and formed by the user and/or at the user device. At step 220 one or more image assets of the media asset sources are selected and marked, for example, the image assets are defined by replacement markers on the first frame of each of the media asset sources. At step 230, the media asset sources frames (e.g. all frames) are analyzed to detect and extract different features such as frame features. Examples of the features may include, but not limited to, size, color, shape, location in the frame (e.g. coordinates x,y,z) and tilting (e.g. angle). The extracted features of the image assets along the frames of the media asset source are used to determine (e.g. in real time) the processing of the media recording. In accordance with embodiments, the analysis and/or transformation steps comprise utilizing extrapolated methods, such as easing functions: for example linear, sine, Quad, Cubic, Quart, Circ, Elastic and the like, to extract the one or more features of the media asset sources which will later be mixed and synchronized with the media recording. The analysis comprises providing features for each frame according to a plurality of processing modules, such as blending module, transformation module and image sizing module. In some cases, the features extraction analysis and transformation of the image assets are performed in an offline mode or in an online mode. At step 240 one or more media recordings are received, for example via the network from the user device. In some cases, the media recordings may comprise user video and user audio data. In some cases, the recordings are recorded by a user of the device, such as device 34, for example, while playing one of the media asset sources. At step 250 one or more elements (e.g. user images) in the media recordings are selected and processed to match the selected image assets of the media asset sources. In some cases, the selection is performed automatically and comprises identifying and selecting, for example, the user's face or full body image in the media recording and processing the selected image so it will fit the media asset and/or the image asset. In some cases, the selection is performed manually by the user. At step 260, the features of the image asset that were extracted on step 230 are applied to the selected user image to enable replacing the user image with the selected image asset. For example, a computed transformation matrix and/or image sizing are executed on the media recording. At step 270 the video and/or audio of the media asset source and the media recording are mixed. At step 280 the mixed media assets are post-processed. In some cases, the post-processing comprises smoothing the blended edges of the mixed media assets, such that the media recording and the media asset source will naturally match. In some cases, the processing further comprises color filtering each frame of the mixed media assets. At step 290 the mixed and processed mixed-media assets are synchronized, for example, to yield one or more different mixed media assets, for example, multiple mixed-media assets variations. In some cases, the synchronization includes additional audio and video filtering, such as low pass filtering, to eliminate or reduce noise resulted from the audio and video alignment and mixing.

Figure 2B:
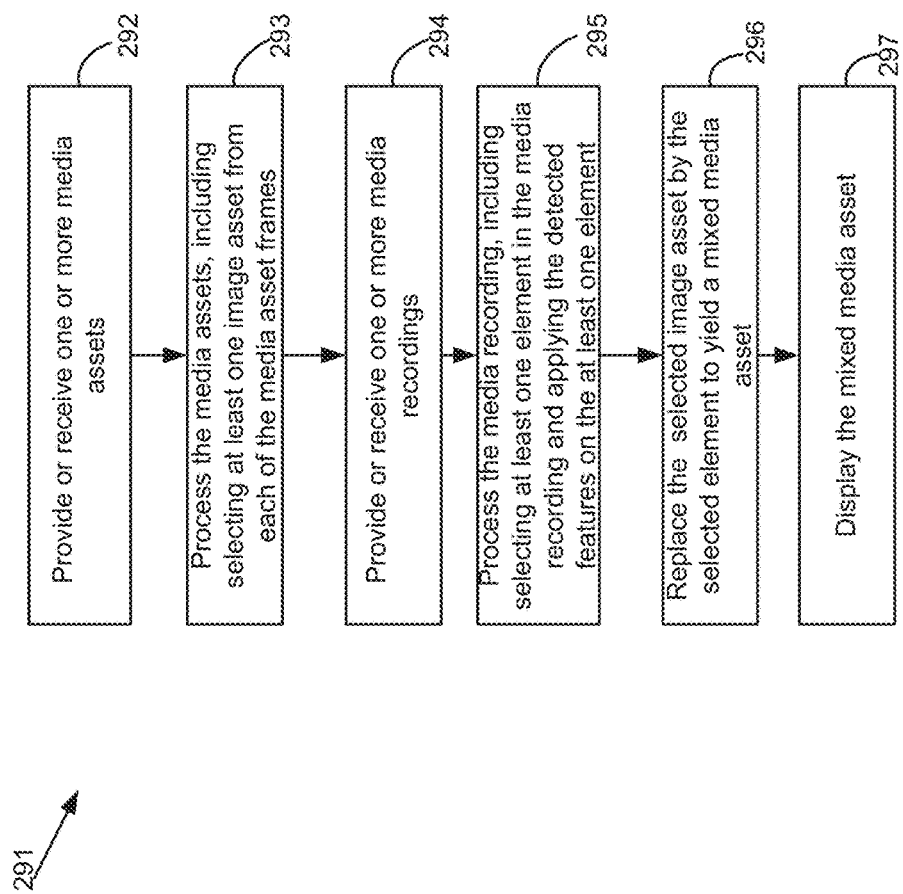
FIG. 2B shows a flowchart of a method for mixing one or more media assets with one or more media recordings, in accordance with embodiments.

FIG. 2B shows a flowchart of a method 291 for mixing one or more media assets with one or more media recordings, for example a single media asset with a single media recording, including processing and editing a media asset selected from a list including the one or more media assets by replacing one or more images at the selected media asset with one or more elements such as image elements in the media recording, in accordance with embodiments. At step 292 one or more media asset sources are provided or received, for example at a user device. At step 293 the one or more media asset sources are processed. The processing includes, in some embodiments, selecting at least one image asset from each of the one or more media asset sources frames and detecting features at the selected image asset sources along the media asset sources frames. At step 294 one or more media recording are received or generated. The media recording may include a client video and client audio data recorded for example by a user of the client device, in accordance with embodiments. At step 295 the media recording is processed. The processing includes selecting at least one element, such as image element, in the media recording and applying the detected features on the media recording and/or the at least one element. At step 296 the selected image asset of the one or more media asset sources is replaced, for example, frame by frame, with the selected at least one element to yield a mixed media asset. Examples of the replacing and mixing process are illustrated herein in reference to FIG. 4. At step 297 the mixed media asset is displayed, for example at the user device display or shared via the network for example to a social media platform.

Figure 3A:
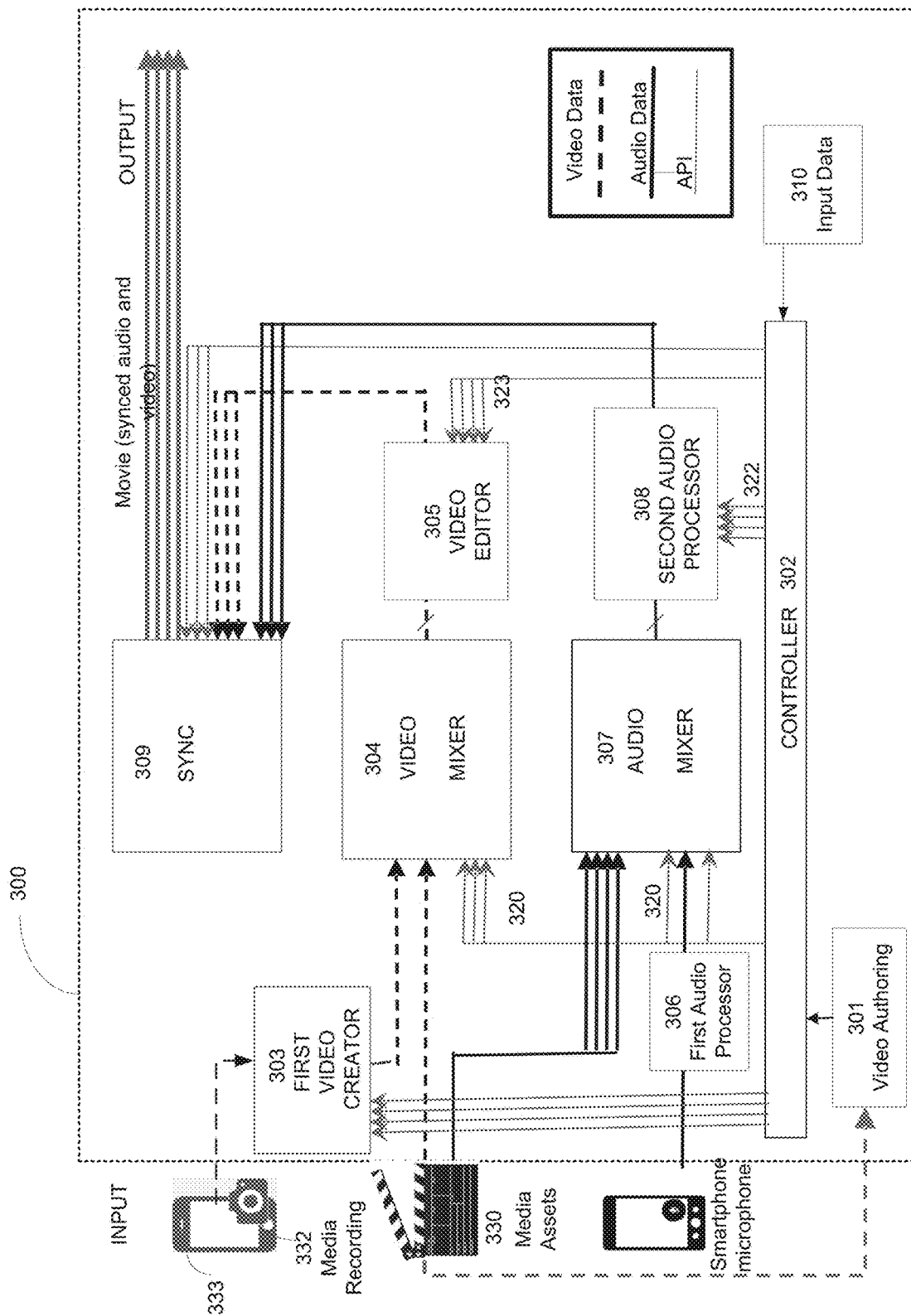
FIG. 3A shows a block diagram of an automatic real-time movie creator system, in accordance with embodiments.

FIG. 3A shows a block diagram of an automatic real-time movie creator module 300, in accordance with embodiments. In some cases, a user may download, for example from a server, an application which includes module 300 and may run the module by his mobile device processor. Module 300 comprises a controller module 302 which is configured to receive and manage data, such as input data 310. The input data may include media asset sources definition and characteristics (e.g. time stamps, tracks etc.). For example, the controller module 302 may receive input data 310 including instructions to provide a plurality of mixed media assets, e.g. four types of movies such as comedy, horror, musical and drama. The controller module 302 is configured to process the received input 310 and provide accordingly one or more processing instructions 320 to the system's modules for further editing and mixing the media assets 330 and the media recordings. The processing instructions may include for example color filtering or other filtering methods.

Module 300 further comprises a video authoring module 301, which is configured to receive media asset sources 330 and perform one or more pre-processing transformations on the media asset sources 330. The pre-processing transformations are required for analyzing and preparing features of the media asset sources 330 for the following mixing and synchronization steps. Specifically, the pre-processing comprises providing features for each frame according to a plurality of processing modules, such as blending module, transformation module, and image sizing module. According to some embodiments, the video authoring module 301 receives replacement markers of the image asset for example for a single frame of the media asset sources 330 and analyzes the image asset for all media asset frames. For example, as illustrated in FIG. 3C, a number of frames, for example each frame 392 of the media asset source 330 (e.g. an mp4 file or any other type of file), may include replacement markers (e.g. alpha map) of the image asset in the form of a [1,0] mask wherein '1' defines the location where the user's media recording will be integrated and '0' defines the location where the user media recording will not be integrated. Specifically, the window image 394 of the house 393 will be selected as the image asset to be integrated with and include the user image and therefore the window area will be extracted and replaced with selected elements of the media recording in accordance with a number of editing methods as illustrated herein in respect to FIGS. 2, 3A and 3B. The analysis comprises preparing features for each frame according to a plurality of processing modules, such as Blending module, Transformation module, and Image sizing module, as will be illustrated herein below.

Blending module is configured to provide information required for alpha blending composition. The Blending mode software module checks that alpha blending information exists for the video asset source frames. In case alpha blending information does not exist for some frames, it calculates the variance of chroma of the pixels within the replacement markers to generate accordingly alpha blending data for each frame of the media sources.

Transformation module evaluates a transformation matrix which comprises rotating and/or cropping and/or placing in the image asset frames along the successive frames of the media asset source. In some cases, the transformation matrix is determined by vector coordinates x, y, z and alpha channel. The transformation module is configured to track the image rotating or cropping between frames and define the coordinates vectors x, y, z for each frame. A detailed explanation of the transformation processes is illustrated herein in reference to FIG. 3B.

In another embodiment, the video authoring module 301 receives multiple set of image assets of a single media asset source and performs the processing simultaneously and in real-time for multiple set of image assets.

It is noted that the video authoring process is typically performed off line, however, in some cases the authoring process may be performed online.

The module 300 further comprises a first video creator module 303 which is configured to receive one or more media recordings such as media recording 332, recorded for example at the user's smartphone 333 or by any type of video camera, and automatically identify one or more elements such as the user's image on the media recording 332. Once the image is identified a number of image pre-processing actions are performed to swiftly and naturally fit the media recording to the media asset source 330. For example, the video creator 303 is configured to detect one or more image faces, such as the user's face in the recording. If the image face is detected, it will be defined as the user image to be processed by the module 303. If the image face is not detected, the entire image of the user's recording will be defined as the user's image.

In accordance with embodiments, the first video creator 303 module is in communication with the video authoring module 301 and/or the controller 302 for receiving detailed info on the media assets 330 image frames, such as image size w(frame) h(frame) of every frame and accordingly resizing the user's image. Additionally, the first video creator module 303 is configured to receive the coordinates vectors x, y, z of the transform matrix for each frame of the media assets 330 and generate accordingly the transform matrix for the user image.

In some embodiments, the first video creator 303 is configured to receive detailed info relating to multiple image assets and may simultaneously (e.g. in real time) pre-process the multiple image assets as illustrated herein above.

Following the pre-processing process, the processed output recording is transmitted to a video mixer module 304 for blending the processed media recording with the media assets to yield one or more mixed media assets. At the next step, the mixed video assets are transmitted to a video editor 305 for producing one or more, for example multiple variations of the user's recording (e.g. images) mixed with media asset, according to one or more video editing instructions 323 received for example from the controller 302. In some cases, the editing process comprises resizing the mixed image and/or rotating it according to the received editing instructions, to yield multiple variations of the user image mixed with the media asset sources.

In another embodiment, the video editor 305 receives multiple different mixed media assets and generates different variations of user image in a way that the user image will match the character of the content type of the media asset. This process may be done by color filtering mechanism which is applied to every user image combination.

Module 300 further comprises a first audio processor module 306 configured to receive an audio recording (e.g. as part of the user's video recording) recorded for example at the user's device 333 and pre-process the audio recording. The audio processing comprises eliminating the user's device output signals (e.g. distorted signal that microphone intercepted from device speakers) echo cancellation and adding background audio for each frame of the mixed audio asset. According to some embodiments, the processing comprises noise cancellation, signal interpolation, and signal error concealing At the following step, the processed audio recording is transmitted to audio mixer module 307 which is configured to receive media assets 330 and mix the processed audio recording with the media assets. The mixed media assets are further transmitted to a second audio processor module 308 which is configured to process the mixed media assets according to one or more audio processing instructions 322.

In some cases, the audio processing instructions 322 are based on input data 310 received for example from the user (e.g. the media recording user). For example, the controller module 302 may receive an input data 310 including for example instructions to provide a plurality of mixed media assets, e.g. four types of movies: comedy, horror, musical and drama. The controller module 302 processes the received input 310 and provides accordingly the audio processing instructions 320 to the system's modules for further editing and mixing the media assets and the users assets. For example, the audio processor 308 is configured to provide four types of sound-tracks in accordance with each movie category (e.g. comedy, horror, musical and drama) and process the mixed sound tracks so it will be compatible with the media assets source music.

In some cases, the input data 310 may be determined by the server, based on predefined rules or random selection. Alternatively or additionally, users may input instructions to the server over the network to indicate their selection of one or more of the media assets for inclusion in the mixed media asset. These instructions may be input in advance or even in real time as the mixed media asset is downloaded and played.

At the final step, the multiple edited and mixed video assets and audio assets outputs are transmitted to a synchronization module 309 which synchronizes the mixed audio and video assets to yield one or more, for example, a plurality of different synced media assets. The synchronization process, in accordance with embodiments, comprises encoding and synchronizing simultaneously for example in real-time each media asset of the multiple mixed media assets to provide different categorized media assets.

In some embodiments, the multiple synced outputs variations are based on a single video asset source mixed with different variations of the media recording (e.g. user image).

In some embodiments, the multiple synced outputs variations are based on a single recording mixed with a plurality of different video asset sources.

According to some embodiments, the first audio processor module 306, the audio mixer module 307, and second audio processor module 308 may process the audio recording or the mixed audio recording according to audio processing methods as known in the art such as methods described in U.S. Pat. No. 8,782,176 entitled "Synchronized video system", the entire disclosure of which are incorporated herein by reference.

Figure 3B:
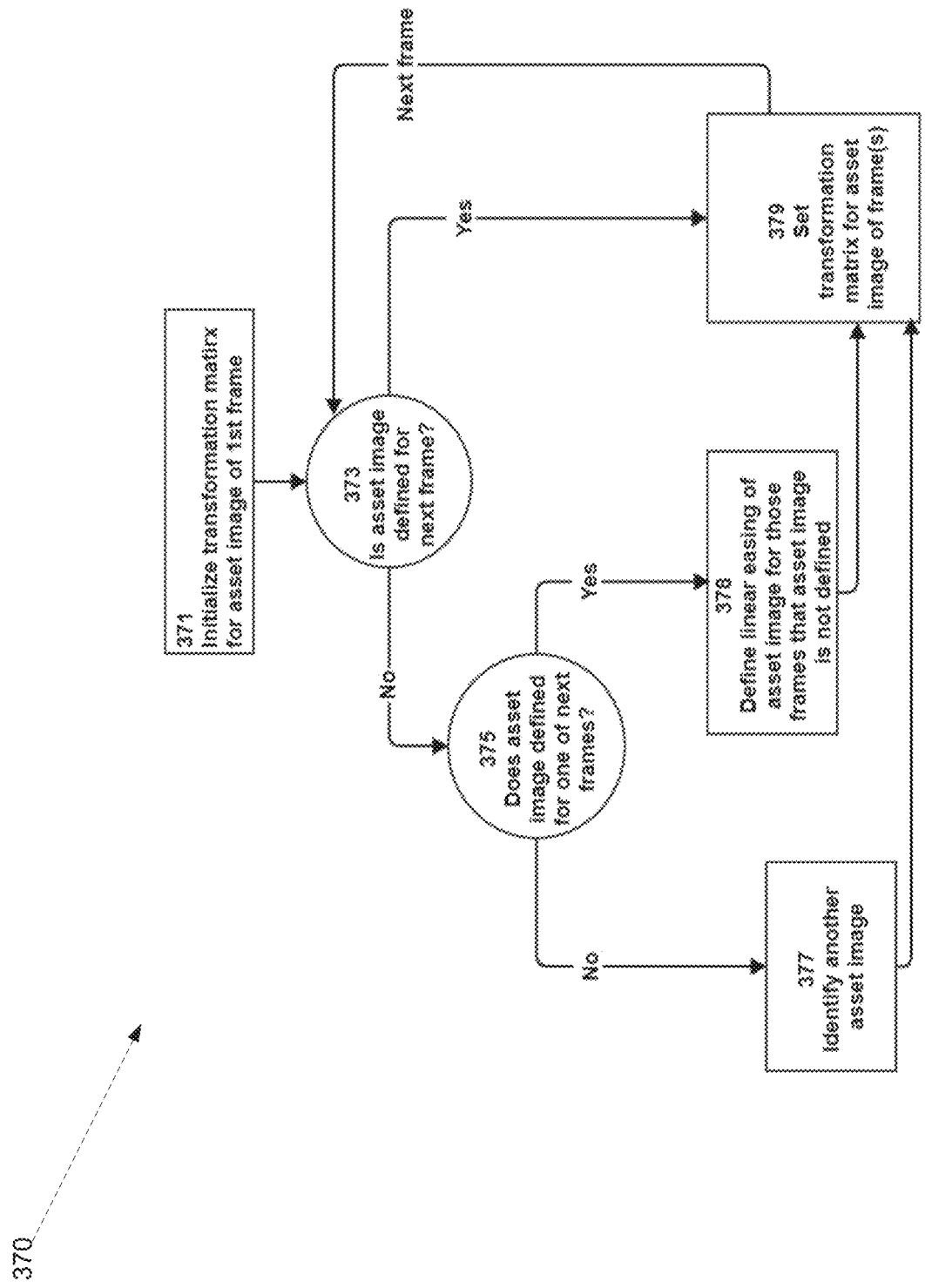
FIG. 3B shows a flowchart of a method for transforming frames of media asset sources, in accordance with embodiments.
Figure 3C:
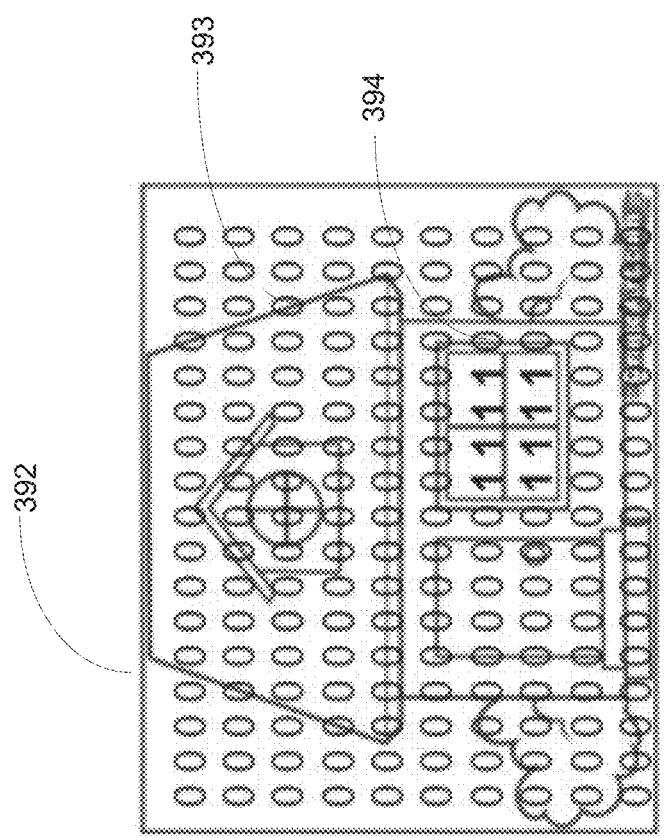
FIG. 3C shows a media source image comprising replacement markers, in accordance with embodiments.

FIG. 3B shows a flow chart of a method 370 for transforming each or selected frames of the media asset sources 330, in accordance with embodiments. At step 371, the transformation module receives an image asset definition of the first frame using replacement markers and initializes a transform matrix for evaluation of the transformation matrix for the following frames. In some cases, the transformation matrix may be a 4×4 matrix that defines the linear transformation of image place and rotation over time on the frame. At step 373, the transformation module checks whether the image asset markers are defined for the next frame. If image asset markers are defined for the next frame, then at step 379 the transformation module sets the transformation matrix for the image asset of the next frame. In case image asset markers are not defined, then at step 375 the transformation module checks whether for any of the following frames, image asset markers are defined. If an image asset markers are defined for one of the following frames, then at step 378 the transformation module performs a linear easing of the image asset for all frames between the two frames that the image asset markers defined. Then, at step 379 the transformation module sets the transformation matrix for the image asset of all the frames. In the case, at step 378, no image asset markers are defined for any of the following frames, then at step 377 the transformation module identifies a new or another image asset for the current frame, and at step 379 the transformation module sets the transformation matrix for the new image asset of the frame. Following step 379, the transformation evaluation process proceeds to the next frame, until all the frames of the media asset are processed. In accordance with embodiments, the image sizing module comprises identifying for each frame of the media asset, any change in the image size by comparing to one another successive frames of the media asset. For example, the scalar image asset size may be identified by measuring the height and width in pixels per each frame (e.g. w(frame), h (frame)). In case, the replacements markers are missing for a specific frame of the image asset, then arbitrary values are determined for the specific image asset, for example according to predefined rules.

In one embodiment, the video authoring module 301 is configured to receive a plurality of media assets sources and simultaneously (e.g. in real time) process the plurality of media assets sources to provide a number of processed media assets ready to be mixed with the user media recording.

Figure 4:
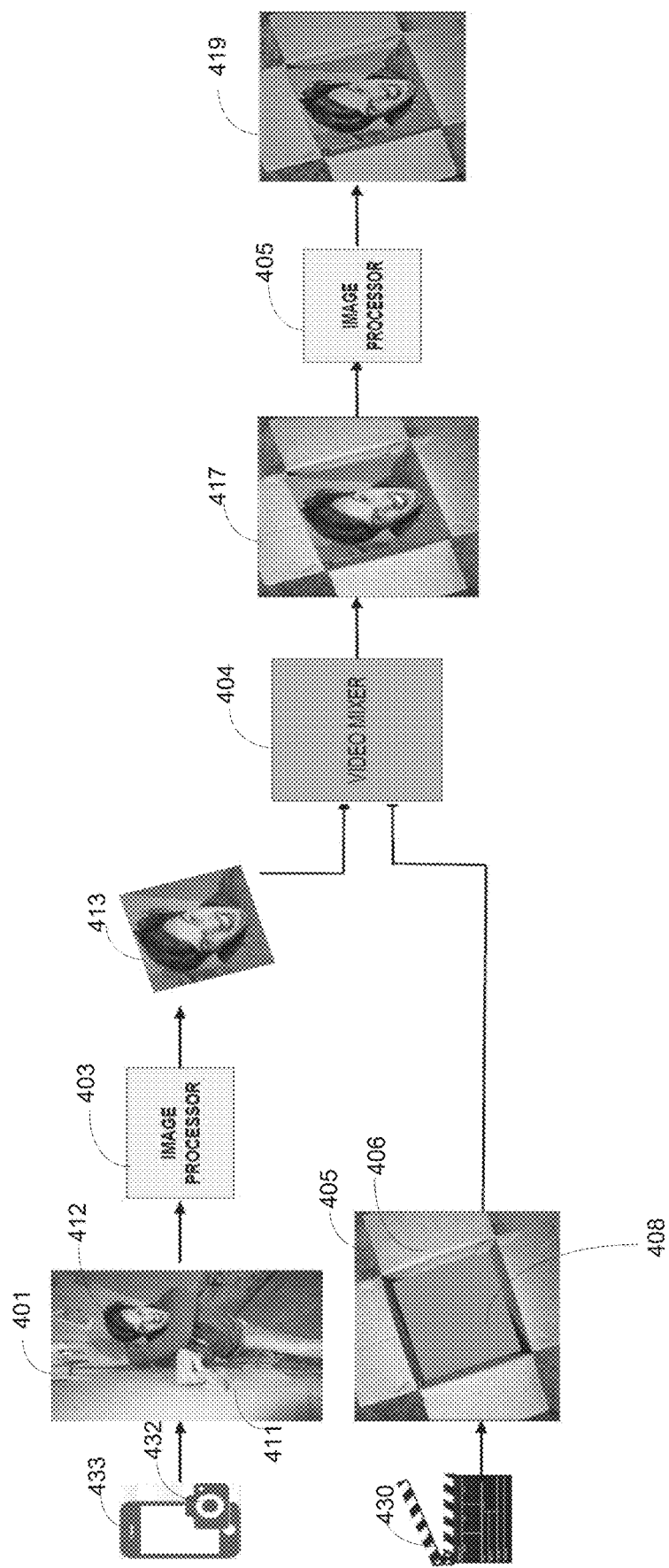
FIG. 4 shows a schematic representation example of a method for processing and mixing a user media recording to yield one or more mixed media assets based on a single user media recording, in accordance with embodiments.

FIG. 4 shows a schematic representation example of a method for processing and mixing a media recording, such as a media clip 432 with a media asset 430, in accordance with embodiments. The user records a media recording such as media clip 432 and uploads the recording for example to his mobile device 433. A first frame, such as frame 401 comprising an image of the user 412 and general background 411 is processed by image processer module 403. The image processing is performed according to data (e.g. including replacement markers) received by a mixing module such as the mixing module 300 of FIG. 3A on one more source media assets, such as media asset 430, which were selected by the user to be mixed with the media clip 432. In the example shown in FIG. 4 the media asset comprises an image 405 of an open box 406 including a square 408 at the center, accordingly the image processor module 403 identifies the user's face 412 and rotates the face 413 so it will match the square 408 size and position. In some cases the processing comprises color filtering and additional transformation to match the user image color to the source media asset background color.

The processed image 413 and source image is transmitted to the video mixer 404 which is configured to replace the square 408 with the face image 413, providing a mixed media asset 417. The mixed media asset is transmitted to the image processor module 405 for processing the mixed image 417. The processing comprises color filtering, background eliminating and auto fitting the frames to yield an improved mixed image 419. This process is repeated for all frames of the media recording to generate a mixed media asset.

In one embodiment, the video mixer 404 receives concurrently for example in real-time multiple different video assets and mix each video asset with media recording to generate multiple mixed video assets, each mixed with media recording.

Figure 5:
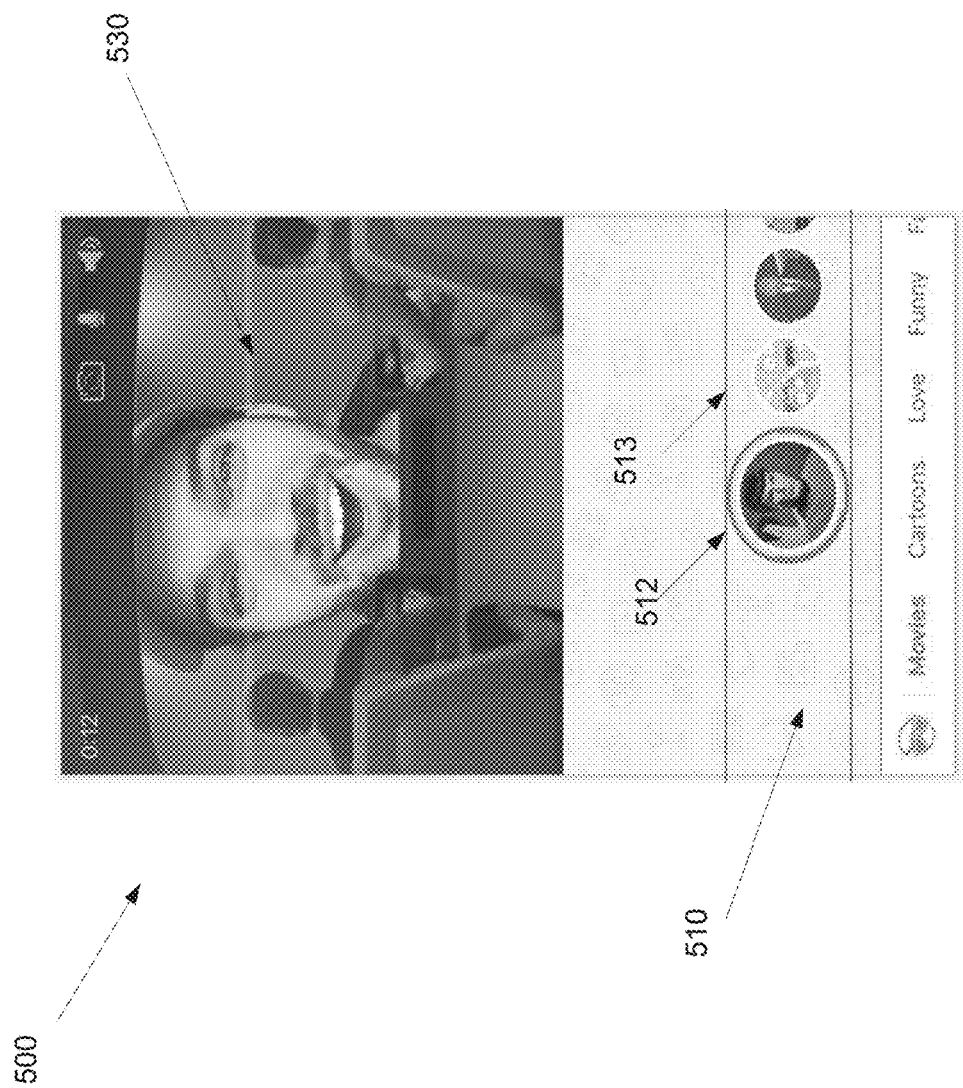
FIG. 5 is a schematic representation of a user interface screen, in accordance with embodiments.

FIG. 5 is a schematic representation example of a user interface screen 500 that is transmitted for example from server 22 to client devices or may be coded on a device itself, such as the user device (such as devices 30, 32, 34), for example in the form of an application, in accordance with some embodiments. Server 22 may automatically adjust the screen to the type of client device and the software that it is running. For example, different screen versions may be provided for tablets and other mobile devices, as well as for integration in social networking applications, such as Facebook®.

Screen 500 allows users to select different functions in order to create and/or play mixed media assets. For example, a scrollable strip of "categories" 510 lists different source clips that users may choose, such as 'Movies-star track' 512, 'Cartoons-Simpsons' 513 etc. When a user selects one of these categories, or once he plays his recording such as a 'selfie' recording 530 the system will automatically present, for example in real-time the media recording 530 mixed with one of the selected categories. For example, as illustrated in FIG. 5 the user's image is presented as part of star-track space shuttle screen.

According to another embodiment, there are provided systems devices and methods for mixing and/or synchronizing one or more media asset sources, such as a selected media asset source with a media recording. Specifically, the methods and systems include automatically processing the media recording and placing one or more video objects such as an avatar or a cartoon figure on all media recording frames. For example, a user may select or generate a media asset including a video presenting an object such as a virtual character object which may be automatically mixed with a media recording such as a user's media recording. In some cases, the virtual character may be created or selected from a video objects database, according to one or more categories (e.g. comedy, musical, drama etc.). In some cases, the virtual character may be a 2D (two-dimensional) or 3D (three dimensional) AR (augmented reality) or VR character such as an avatar, or the like. In accordance with embodiments, a video of the selected character is projected on the media recording and accordingly pixels of the media recording are replaced with image pixels of the selected character.

Figure 6:
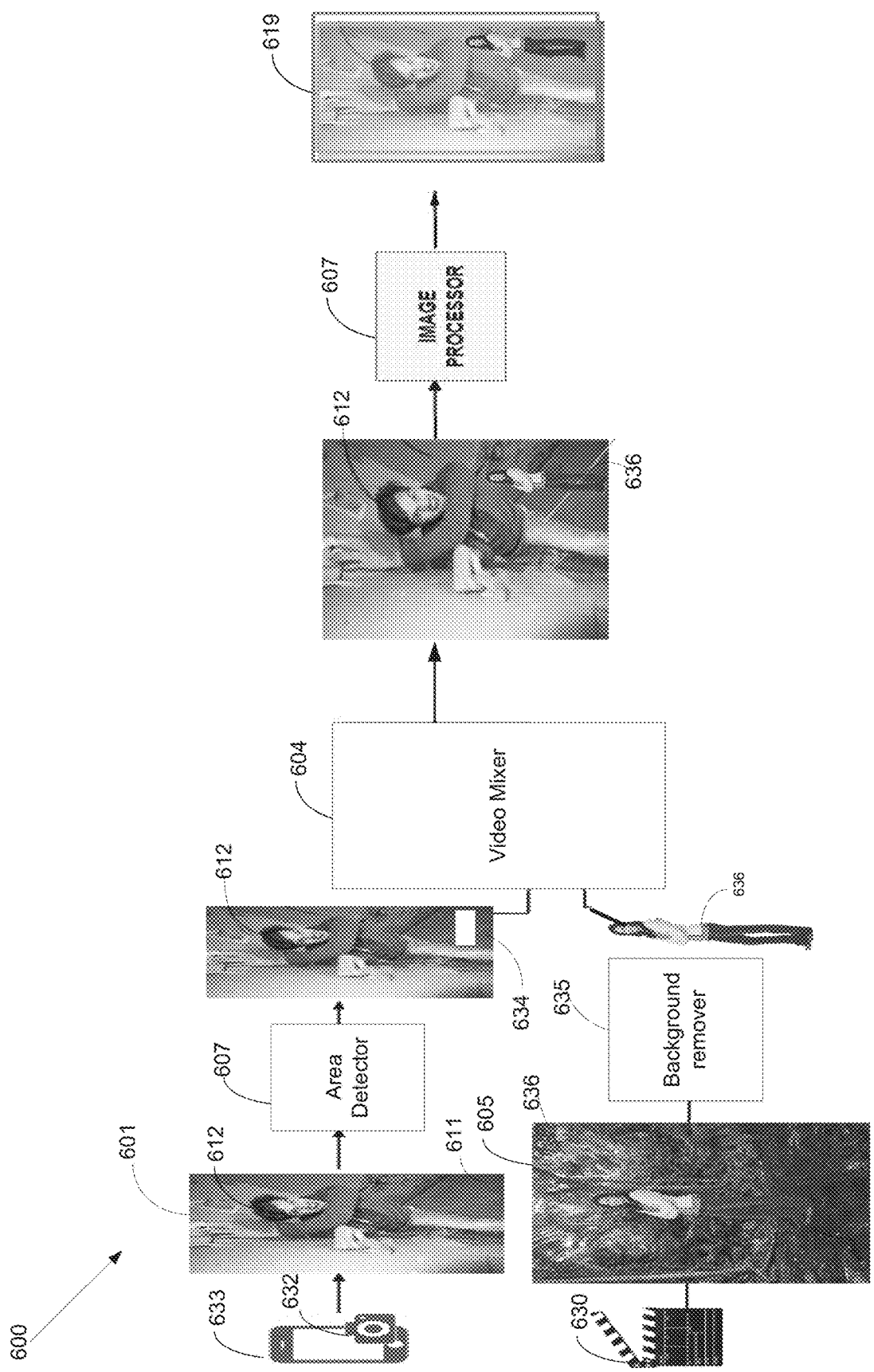
FIG. 6 shows a schematic representation example of a method for processing and mixing a media recording with a media asset source, in accordance with embodiments.

FIG. 6 shows a schematic representation example of a method 600 for processing and mixing a media recording with a media asset source wherein the media asset source comprises, for example, one or more video characters such as virtual characters, in accordance with embodiments. The method 600 may be performed by a user device such as a mobile device, a tablet or a console. For example, the user device may be a smart phone having a processor for running a video and the mixing application, a display for displaying the video and an interface for receiving user's operation and output as illustrated herein in respect to FIG. 1. In operation, the user records a video such as a media clip 632 and uploads the recording for example on his device 633 or on a server or on any other device. Once the user downloads and initiates the mixing application which includes a mixing module 701 (illustrated herein in reference to FIG. 7) the uploaded media recording is processed for example frame by frame. In some cases, the uploaded media clip 632, including frames such as frame 601 which may comprise an image of for example a user 612 and general background 611. The media recording frames may be processed by an area detector module 607 which is configured to detect an area or specific elements in the media clip 632 frames to place and mix an object of the selected media asset source 630. In some cases, the detected area may be a surface area such as a flat surface, e.g. floor, table or chair or other locations where the selected object of the medias asset source naturally fit. In some cases, the detected area is the area which is optimal for placing and mixing the object of the media asset 630. In the example shown in FIG. 6, the video creator may identify a surface area 634 as the selected area to position the media asset source.

According to some embodiments, following the media recording or concurrently as the user records or uploads the media clip the user selects one or more media asset sources from a list of media assets sources 630 that he wishes to mix with the recorded media clip 632. The media asset source frames such as frame 605 may include a character 636 (e.g. a lady) and background 604 (e.g. Jungle). At the next step, the selected media asset source is processed by a background remover module 635 which is configured to process the media assets source so one or more objects within the media asset will fit and be naturally mixed with the media recording 632. The processing may include, for example, removing background pixels from the media asset and/or replacing and/or adding pixels of the media asset source with pixels of the media recording 632. For example, the background remover module 635 is configured to successively process each frame of the selected media asset such as frame 605. In operation, the background remover module 635 removes the background pixels and process the object pixels so each frame of the selected media asset source will later fit the detected surface area 634 in the media recording. In some cases, the processing also includes color filtering and additional transformation to match the media recording and/or object 636 color or size to one another.

At the following step, the video mixer module 604 mixes the media recording 632 with the processed object 636 to yield a mixed media massed including object 636 placed at each frame on area 634.

In some cases, the mixed media asset is transmitted to an image processor 607 for further processing the mixed frames of the mixed media asset. The processing may comprise color filtering, background eliminating and auto fitting the frames to yield an improved mixed image 619. In some embodiments, video mixer 604 is configured to receive concurrently for example in real-time multiple different video assets sources and mix each video asset with media recording to generate multiple mixed video assets, each mixed with media recording.

Figure 7:
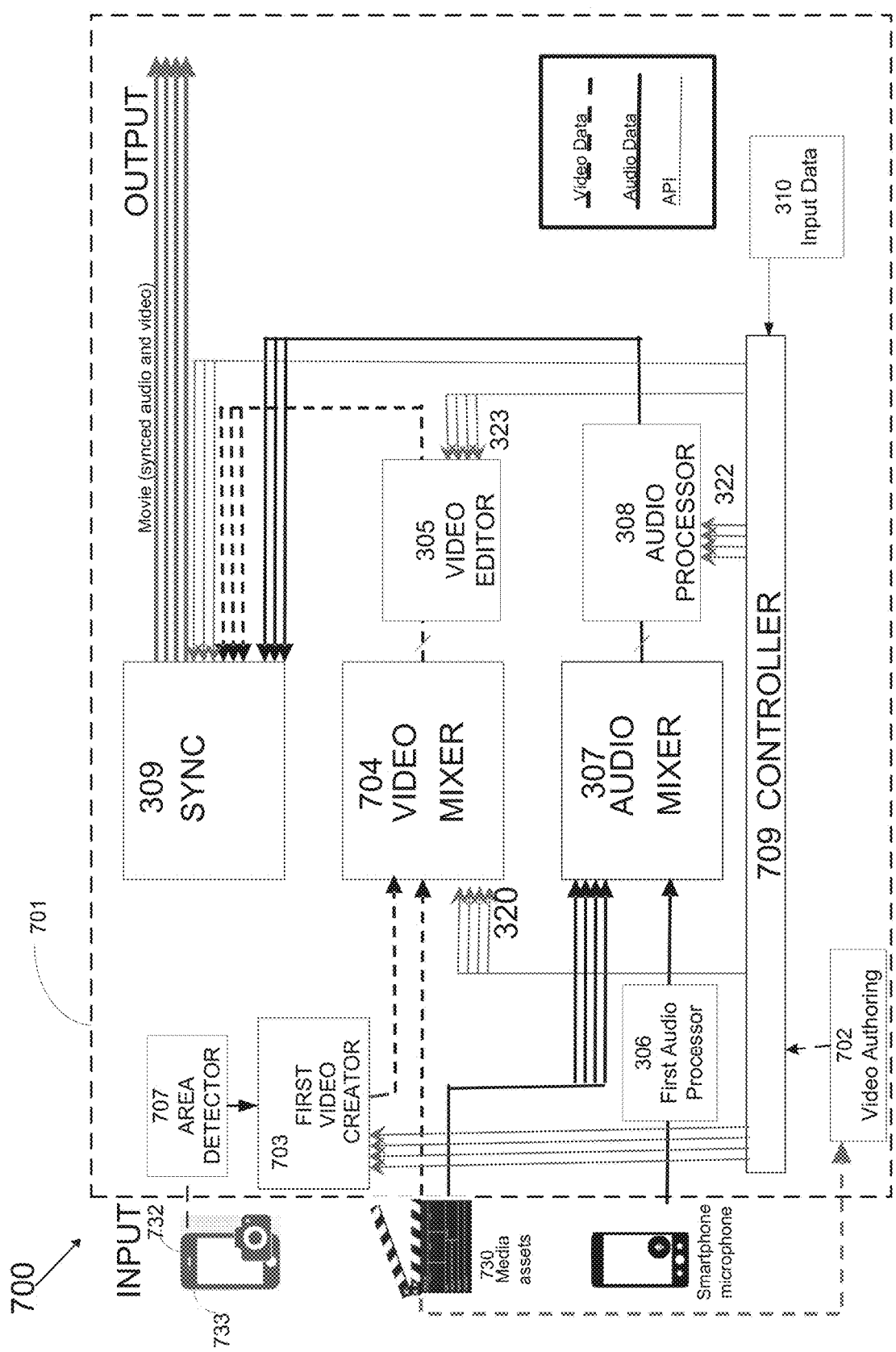
FIG. 7 shows a block diagram of an automatic real-time movie creator system 700, in accordance with embodiments.

FIG. 7 shows a block diagram of an automatic real-time movie creator system 700, in accordance with embodiments. The system 700 comprises a mixing module 701 which is configured to mix and synchronize one or more media asset sources, including for example one or more AR or animated character selected for example by the user, with one or more media recordings, such as videos recorded for example by a smartphone camera or any recording device. In some cases, the module 701 is configured to automatically or autonomously detect and select an area within the media recording such as a surface area (e.g. a table or floor image within the recording) and position the selected media asset source on the surface so the mixed media asset will naturally match, as illustrated in reference to FIG. 6.

System 700 includes some of the elements of aforementioned module 300 with additional elements for mixing and synchronizing one or more media asset sources with a media recording, e.g. replacing pixels of the media recording with pixels of an object of a media asset. In accordance with embodiments, module 701 includes an area detector module 707 configured to identify and select one or more areas or elements in the received media recording (e.g. the received camera feed or a video recording which was recorded by the user) where the media asset source will later be placed. For example, as illustrated in FIG. 6 the area detector module 707 is configured to detect a surface (e.g. floor) in the media recording where the selected character will be added and appear as part of the formed mixed media asset. In operation. the area detector module 707 is configured to receive a media recording 732 as recorded for example at the user's a smartphone 733 or by any type of video camera, and automatically identify a surface area at the received recording and send to a first video creator module 703 where to place the character or an orthogonal mesh including the character on the media recording.

In accordance with embodiments, the module 701 further includes a video authoring module 702 configured to receive the selected media asset sources 730 and superpose an alpha map on each frame of the selected media asset source to determine which pixels of the selected media asset will be included in the mixed media asset and which pixels will be replaced or deleted. In accordance with embodiments, the selected media asset sources 730 may include one or more objects which the user may select and the module 701 may automatically mix with the media recording 732. In some cases, the objects may be or may include full body elements such as an AR or VR characters or animated characters as illustrated in FIGS. 9A-9E and FIG. 6. The processed media asset sources 730 are further transmitted to a controller 709 for receiving detailed info on the processed media assets 730 image frames, such as image size w(frame) h(frame) of the frames and accordingly resizing the user's image.

A detailed description of the processing method as performed by the video authoring module 702 is described herein above in reference to FIGS. 9A-9E.

In accordance with embodiments, the module 701 further includes a first video creator 703 which is configured to receive the media recording and the detected area (e.g. selected surface) as defined by the area detector module 707 and place a mesh (e.g. a clear colored mesh) on the selected area and send the processed media recording to a video mixer 704 where the selected media asset source will be further mixed with the media recording. Specifically, the video mixer places the selected media asset source (e.g. the AR character) on the mesh and replace pixels of the media asset source by pixels of the media recording (e.g. replacing media asset background pixels) while keeping the pixels of the media asset source. In some cases, the mixing process is performed successively frame by frame, for example in real-time. A detailed description of the processing method as performed by the first video creator 703 and the video mixer module 704 is illustrated in reference to FIG. 8.

Figure 8:
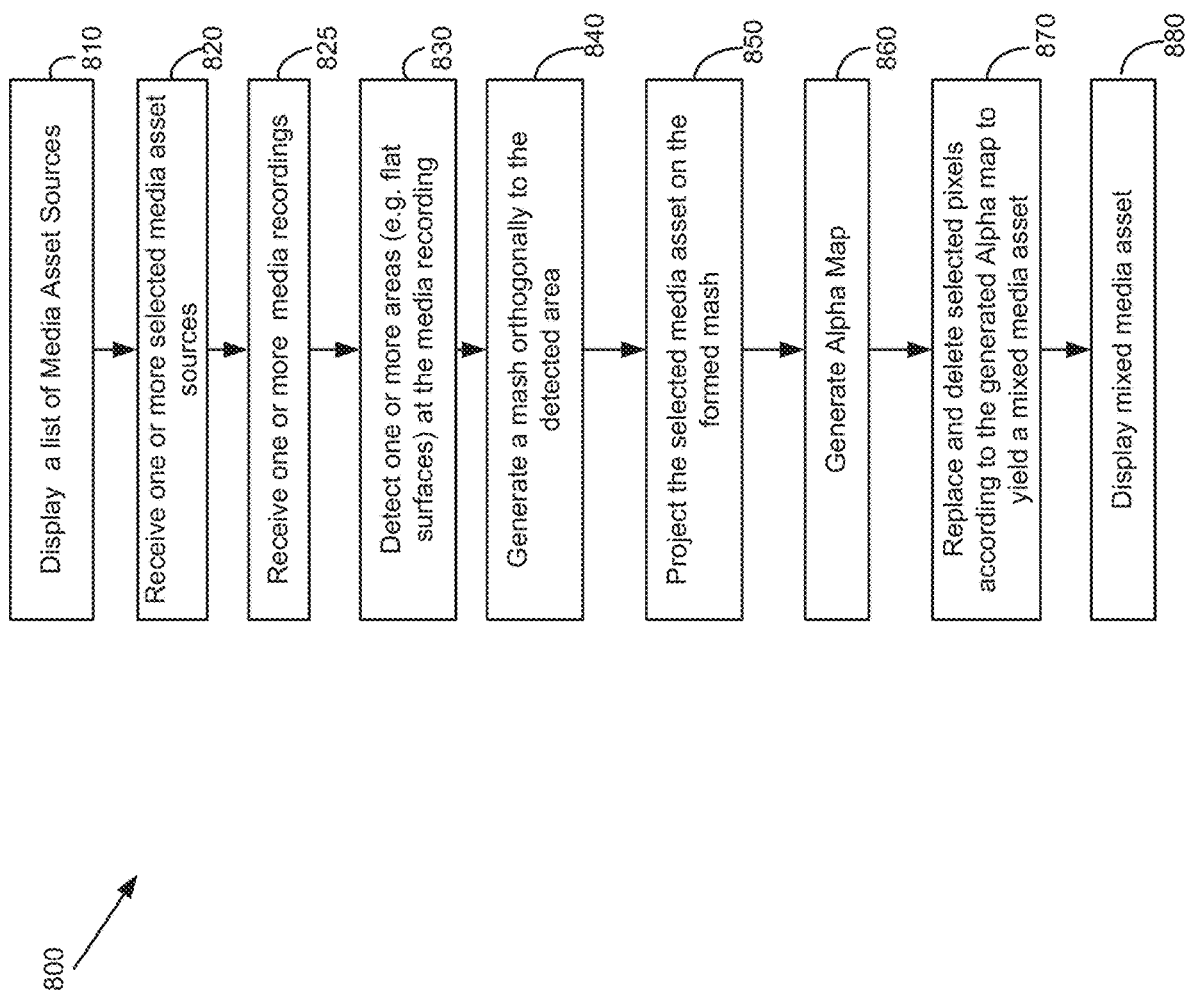
FIG. 8 shows a flowchart of a method for mixing a media asset source with a media recording, in accordance with embodiments.
Figure 9:
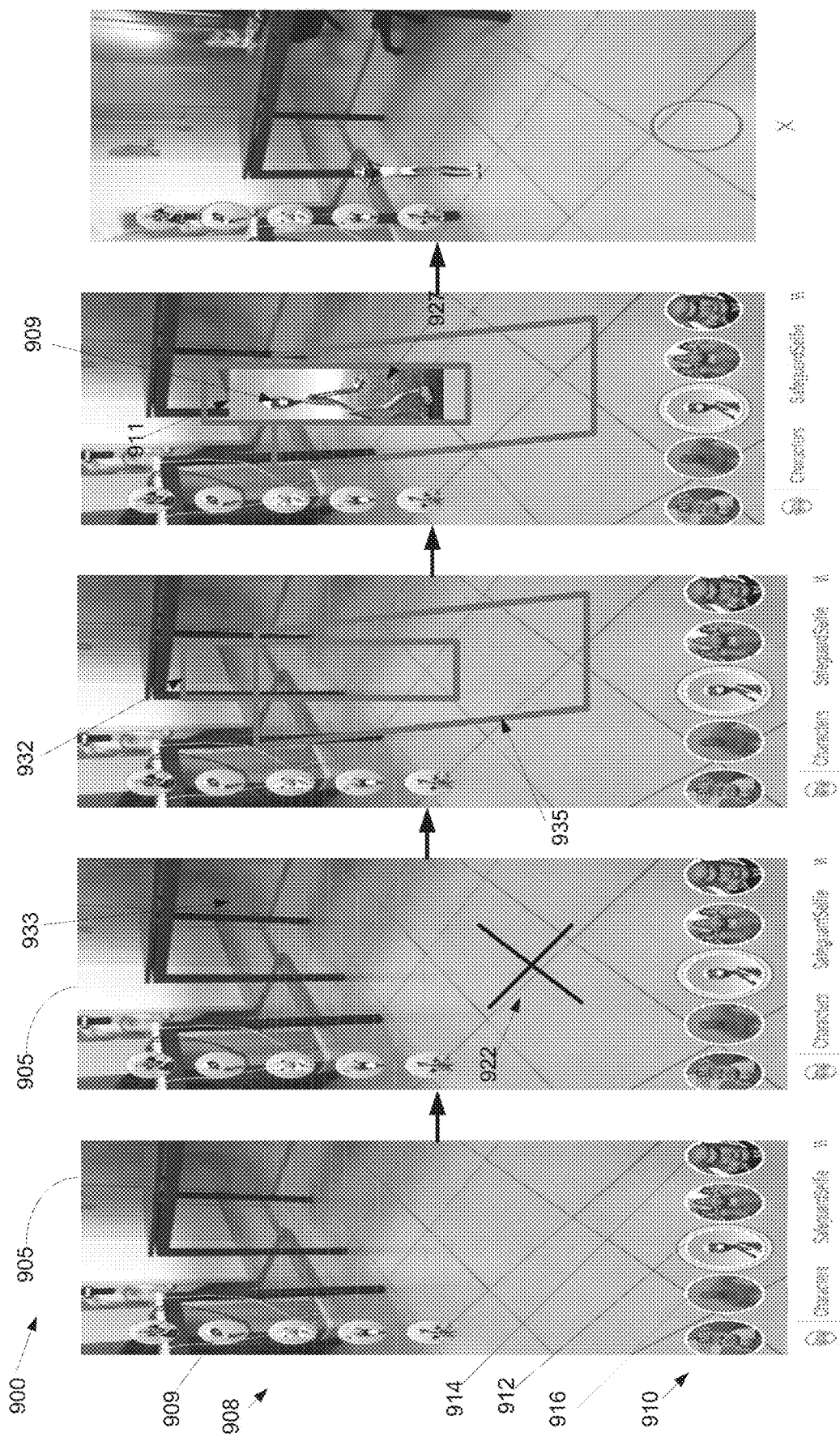
FIGS. 9A-9E show respective examples of related UX (user experience) display views, in accordance with embodiments.

FIG. 8 shows a detailed flowchart 800 of a method for mixing a media asset source such as virtual AR character with a media recording and FIGS. 9A-9E show respective examples of related UX (user experience) display views 900, in accordance with embodiments. At step 810 upon user downloading the mixing and editing application, which runs module 701 described herein above, the mixing application displays to the user, for example on his mobile device display (e.g. client device display), a list of media asset sources such as virtual or AR objects to be mixed with a media recording. For example, a plurality of image objects 910 may be displayed on the mobile device display. In some cases, icons of the image objects are displayed in the bottom section of the media device display, for example on the media recording 905 background. In some cases, as illustrated in FIG. 9A each image object relates to a different category, such as Characters 912, News 914, Sports 916, TV, Movies, Anime, Memes, Real TV, Gaming, etc. In some cases, the one or more media assets may be displayed as the user records a media recording, such as his office place as illustrated in FIGS. 9A-9E. Upon selecting one of the categories a plurality of related image characters, such as five icons 908 for selection are presented. The characters 908 may include for example a 2D or 3D AR characters such as space alien 909. At step 820 one or more of selected media asset sources are received for example at a processor such as a user device processor or at a server. In some cases, the media asset source is determined automatically by one or more processors of the user device, for example, based on the user prior selections or based on other criteria. For example, the selected media asset may include the space alien 909. At step 825 one or more media recordings are received, for example via the network at the client device. In some cases, the media recording comprises client video and client audio data. In some cases, the media recording is recorded by a user of the client device while playing or viewing or selecting the list of the media sources, or the selected media source. At step 830 one or more areas or locations at the media recording (e.g. camera feed) are detected for placing the selected media asset at the detected area. For example, as illustrated in FIG. 9B the one or more processors are configured to detect or target one or more surfaces such as a flat surface area 922 for example at a floor 923 area included the media recording 725, using any appropriate algorithm for detecting a surface and for placing the selected object on the detected surface. For example, the detection may be performed by the area detector module 707 which is configured to choose the "best" surface, for example the one that is being detected most easily, usually the floor. Non-limiting examples of such algorithms for surface detection selection may include, Depth Buffer (Z-buffer), Scan-Line, Area subdivision, Back-Face, A-Buffer, Depth sorting, BSP trees. In some cases, at step 840 a mesh is generated. In some cases, a clear colored mesh is formed for example orthogonally or substantially orthogonally to the detected surface. For example, as illustrated in FIG. 9C a clear colored mesh 932 is generated orthogonally to surface 935. In some cases, as illustrated in FIGS. 9B and 9C a clear colored mesh 932 is generated orthogonally to surface 935 and mesh 933. In some cases, mesh 933 or mesh 932 may be or may include grid-like structure having horizontally and vertically lines which may be lengthwise and crosswise. In some cases, the size of mesh 932 and 933 may be the same size as the video (which includes the character) that is projected on it, for example, 800×800. In some cases, the mesh 932 is shaped as a rectangle and may be generated perpendicularly to the parallelogram shaped detected surface 935. In some cases, the mesh 932 is formed in other shapes. In some cases, the formed mesh resolution is compared to the resolution of the media recording. At step 850 the selected media asset source (e.g. the selected video 911) is projected on the formed mesh (e.g. rectangle mesh) at the detected area. For example, as illustrated in FIG. 9D the selected media asset including the AR space alien character 909 is projected on the formed mesh or on a portion of the generated mesh. At step 860 for each frame of the media asset source (e.g. the selected video) an alpha map is generated, for example at the formed mesh, and in step 870 selected pixels of the media asset source are replaced according to the alpha map frame by suitable (e.g. same sized) media recording pixels for example background pixels are deleted while some pixels, such as the object pixels are kept and displayed to yield a mixed media asset which is displayed to the user at step 880. The displayed mixed media asset includes the processed media recording and the processed media asset. For example, as illustrated in FIG. 9D background pixels 927 of the media asset source 932 are replaced with pixels which match the media recording pixels 905 while the object pixels 909 are projected accordingly for each frame. The formed mixed media asset which includes the object 909 standing on the floor of the user office as recorded by the user is illustrated in FIG. 9E. In some cases, the mixed media asset is generated in real time while displaying the mixed media asset.

In accordance with some embodiments, the method 800 further includes selecting at least one image asset from each of the one or more media asset sources frames and detecting features at the selected image asset sources frames and selecting at least one element, such as image element, in the media recording and applying the detected features on the media recording and/or the at least one element as illustrated in FIGS. 2A-2B.

Figure 10:
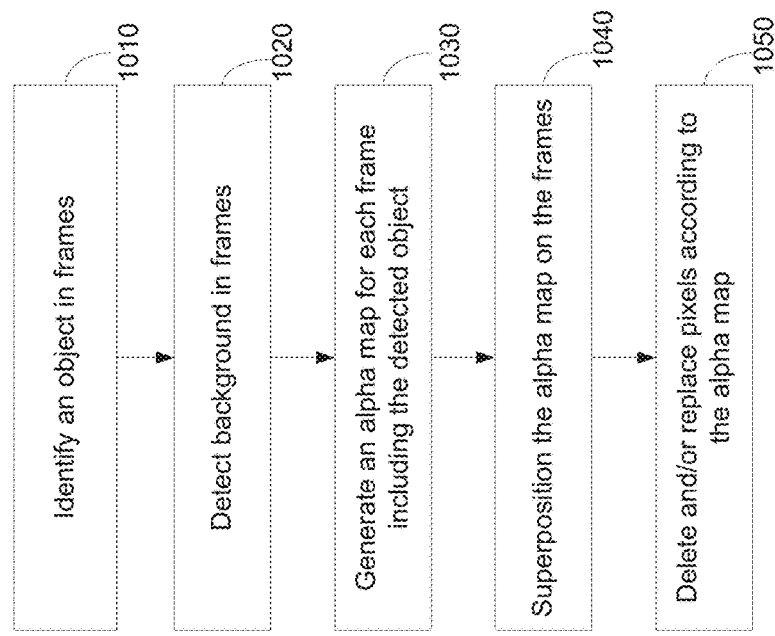
FIG. 10 shows a detailed flowchart of a method for processing a media asset source frames, such as a selected media asset, in accordance with embodiments.

FIG. 10 shows a detailed flowchart of a method 1000 for processing a media asset source frames, such as a selected media asset, including editing and cutting one or more elements in the selected media asset and combining the one or more element with the media recording, in accordance with embodiments.

FIG. 11A-11C show respective examples of frames of the media asset source as processed according to the processing method 1000, in accordance with embodiments. In some cases, the processing method 1000 may be performed in an offline mode or in other modes, for example prior to the mixing of the media asset with a media recording.

At step 1010 one or more objects or elements which appears in more than X frames (e.g. X>72) of the media asset source frames (e.g. selected video) are identified. In some cases, as illustrated in FIG. 11A the identified object or element may be a predefined element. In some cases, the object or element may be or may include an AR or an animated character having a complete body. For example, as illustrated in FIG. 11A a frame 1112 of a selected media asset may include an image of alien 1114 surrounded by a desert background 1116. At step 1020 for each or for some of the frames, the object background is detected. For example, as shown in FIG. 11A a background 1116 of object 1114 is detected for each frame which includes the object 1114. At step 1030 an alpha map is generated for each frame which includes the detected object. The alpha map, in accordance with some embodiments, may include a 2D matrix having the size and resolution of media asset source. The generated alpha maps are used to point and determine which pixels at each frame will be kept and presented at each frame and which pixels will be removed or canceled and replaced by the media recording (e.g. camera feed) pixels. At step 1040 the alpha map is superpositioned for each frame for positioning which pixel to delete or cancel (e.g. background pixels) and which pixel to keep (object pixels). FIG. 11C illustrates an alpha map 1118 superpositioned on the frame 1112, where the '1' numbers represent background area which will be canceled and replaced while '0' numbers represent the object pixels which are kept and mixed with the media recording. At step 1050 pixels for each frame are deleted (or canceled) and/or replaced according to the alpha map 1118. Specifically, as illustrated in FIGS. 9D and 9E for each frame in the media recording the deleted media video pixels are being replaced with suitable camera feed pixels, such as media recording pixels according to the alpha map and editing method 1000 as illustrated herein in reference to FIGS. 10 and 11A-11C.

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Swift, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for media processing, comprising:
   providing one or more media asset sources, via a network to a user device, wherein each of the one or more media asset sources comprises a plurality of source video frames;
   processing said one or more media asset sources, wherein said processing comprises:
   selecting at least one image asset at each of said plurality of source video frames;
   detecting features at the selected at least one image asset along the media asset sources frames, wherein said features are one or more of: size, color, shape, coordinates and tilting of the selected at least one image asset;
   receiving via the network from the user device a media recording;
   processing said media recording, wherein said processing comprises:
      selecting at least one image element in the media recording and applying the detected features on the at least one image element or media recording, using a transformation module for transforming and tracking the selected at least one image asset rotating and cropping between the media asset sources frames and defining the coordinates vectors for each frame; and
      mixing the processed one or more media asset sources with the processed media recording according to one or more selected categories using a mixing module wherein said mixing module is configured to simultaneously yield different variations of mixed media assets according to the selected categories, wherein the mixing comprises:
         identifying and selecting automatically one or more areas or elements in the received media recording using an area detector module;
         generating a mesh orthogonally to the identified area;
         projecting the respective media asset on the generated mesh;
         generating an alpha map on the generated mesh;
         replacing and deleting selected pixels according to the generated alpha map to yield the different variations of mixed media assets.

2. The method of claim 1, comprising processing and synchronizing the one or more mixed media assets, said processing and synchronizing comprises smoothing the blended edges and color filtering each frame of the one or more mixed media assets such that the processed one or more media asset sources and processed media recording will naturally match one another.

3. The method of claim 1, wherein each of said plurality of media asset sources and media recording comprises at least source video data and at least source audio data.

4. The method of claim 3, wherein the mixing further comprises:
audio processing simultaneously and differently each audio of the plurality of media asset sources according to the one or more selected categories to yield the different variations of mixed media assets.

5. The method of claim 4, wherein a plurality of sound-tracks are provided according to the one or more selected categories, said sound-tracks are one or more of: comedy, horror, musical and drama.

6. The method of claim 3, wherein the processing and synchronizing comprises additional audio and video filtering, said additional audio and video filtering comprises one or more of low pass filtering for eliminating noise resulted from the audio and video mixing.

7. The method of claim 1 wherein said selecting at least one image asset at each of said media asset sources comprises providing video replacement markers on each of said one or more media asset sources.

8. The method of claim 1, wherein said at least one element or said at least one image asset is an image of a face or a body.

9. The method of claim 1, wherein the media recording is recorded by the user of a client device while playing at least one of the one or more media asset sources.

10. The method of claim 1, wherein the media recording is recorded by a user of a client device while playing the source audio data.

11. The method of claim 1, wherein the one or more media asset sources comprise one or more 2D (two-dimensional) or 3D (three dimensional) AR (augmented reality) or animated characters or VR (virtual reality) characters.

12. The method of claim 1, wherein said area detector module uses one or more algorithms selected from the group consisting of: Depth Buffer (Z-buffer), Scan-Line, Area subdivision, Back-Face, A-Buffer, Depth sorting, BSP trees.

13. The method of claim 1, wherein the different variations of mixed media assets are based on a single video asset source mixed with different variations of the media recording.

14. The method of claim 1, wherein the different variations of mixed media assets are based on a single recording mixed with a plurality of different video asset sources.

15. The method of claim 1, wherein the transforming and tracking the selected at least one image asset by the transformation module comprise:
receiving the first frame of the selected at least one image asset definition using replacement markers;
initializing a transform matrix for evaluation of the transformation matrix for the following frames;
checking whether the selected at least one image asset markers are defined for the next frame and if affirmative setting the transformation matrix for the selected at least one image asset of the next frame and if negative then checking whether for any of the following frames, image asset markers are defined;
performing a linear easing of the image asset for all frames between the two frames that the at least one image asset markers defined;
proceeding to the next frame, until all the frames of the at least one media asset are processed.

16. The method of claim 15, wherein the transformation matrix is configured to define the linear transformation of image place and rotation over time.

17. The method of claim 1, comprising:
identifying, using an image sizing module, for each frame of the selected at least one image asset, any change in the image size by comparing to one another successive frames of the selected at least one image asset; and
resizing the selected at least one image asset.

18. A system for media processing, comprising:
a memory, which is configured to hold one or more media asset sources; and
a processor, said processor is configured to:
select at least one image asset at each of said plurality of source video frames;
detect features in the selected at least one image asset along the media asset sources frames, wherein said features are one or more of: size, color, shape, coordinates and tilting of the selected at least one image asset;
receive via the network from the user device a media recording; and
process said media recording, wherein said processing comprises:
selecting at least one image element in the media recording; and
applying the detected features on the at least one image element or media recording, using a transformation module for transforming and tracking the selected at least one image asset rotating or cropping between frames and defining the coordinates vectors for each frame; and
mixing the processed one or more media asset sources with the processed media recording according to one or more selected categories using a mixing module wherein said mixing module is configured to simultaneously yield different variations of one or more mixed media assets according to the selected categories,
wherein the mixing comprises:
identifying and selecting automatically one or more areas or elements in the received media recording using an area detector module;
generating a mesh orthogonally to the identified area;
projecting the respective media asset on the generated mesh;
generating an alpha map on the generated mesh;
replacing and deleting selected pixels according to the generated alpha map to yield the different variations of mixed media assets.

19. The system of claim 18, wherein the plurality of media asset sources comprise at least audio data and media data and wherein the processor is configured to simultaneously and differently process each audio data and video data of the plurality of media asset sources according to the input data.

* * * * *